United States Patent
Oosterkamp

(10) Patent No.: US 7,041,410 B2
(45) Date of Patent: May 9, 2006

(54) FUEL CELL STACK IN A PRESSURE VESSEL

(76) Inventor: Willem Jan Oosterkamp, Van Wassenaerweg 19, NL-6862 ZC, Oosterbeek (NL)

( * ) Notice: Subject to any disclaimer, the term of this patent is extended or adjusted under 35 U.S.C. 154(b) by 467 days.

(21) Appl. No.: 10/298,799

(22) Filed: Nov. 19, 2002

(65) Prior Publication Data
US 2003/0162072 A1    Aug. 28, 2003

(30) Foreign Application Priority Data
Nov. 19, 2001    (NL)    ................................... 1019397

(51) Int. Cl.
*H01M 8/10*    (2006.01)
(52) U.S. Cl. ............................. 429/32; 429/34; 429/35; 429/31; 429/13; 429/17
(58) Field of Classification Search .................. 429/32, 429/34, 35, 31, 25, 13, 17
See application file for complete search history.

(56) References Cited

U.S. PATENT DOCUMENTS

| | | | |
|---|---|---|---|
| 5,573,867 A | | 11/1996 | Zafred et al. |
| 6,322,920 B1 * | | 11/2001 | Tomson ........................ 429/34 |
| 6,844,100 B1 * | | 1/2005 | Bourgeois et al. ............. 429/38 |
| 6,849,353 B1 * | | 2/2005 | Vora et al. ..................... 429/31 |

FOREIGN PATENT DOCUMENTS

| | | |
|---|---|---|
| DE | 43 36 850 A1 | 5/1995 |
| JP | 59219866 | 12/1984 |
| JP | 01209671 | 8/1989 |
| JP | 02299168 | 12/1990 |
| JP | 02312169 | 12/1990 |
| JP | 04267068 | 9/1992 |
| JP | 05101842 | 4/1993 |
| JP | 10125346 | 5/1998 |
| WO | 96/26553 | 8/1996 |
| WO | 01/71842 A2 | 9/2001 |
| WO | 02/13303 A1 | 2/2002 |

* cited by examiner

*Primary Examiner*—Bruce F. Bell
(74) *Attorney, Agent, or Firm*—Young & Thompson

(57) ABSTRACT

Fuel cell stack in which anodes and cathodes, and preferably also the membrane separating these, are made of relatively brittle material. To prevent the risk of breakage, and thus leaks, these are enclosed with a tight fit in a pressure vessel and mechanical pressure is produced on raising the temperature. The pressure vessel is preferably of elongated construction and a number of fuel cells are arranged alongside one another. The opposite ends of the pressure vessel delimit compartments for the supply and removal of one of the reactants. The other reactant is supplied to the pressure vessel and removed therefrom close to the ends of the fuel cells.

19 Claims, 2 Drawing Sheets

FUEL CELL STACK IN A PRESSURE VESSEL

BACKGROUND OF THE INVENTION

The present invention relates to a fuel cell stack comprising a number of electrochemical cells, each comprising an anode, cathode and a membrane arranged between them, arranged adjoining one another and in contact with one another in a pressure vessel.

DESCRIPTION OF THE RELATED ART

A fuel cell stack of this type is disclosed in WO 01/71842A2.

Electrochemical cells are used to convert chemical energy into electrical energy in a fuel cell. This is associated with low energy losses if this conversion takes place at high temperatures. A high temperature fuel cell can be formed by placing a zirconium oxide membrane stabilised with yttrium between two porous electrical conductors. If the partial pressure of oxygen on one side of the fuel cell is higher than on the other side, transport of oxygen ions will take place through the zirconium oxide membrane. If the electrical conductors are placed next to the membrane in an electrical circuit, electric current will start to flow. The difference in oxygen partial pressure can be achieved by allowing a gaseous oxidant to flow on one side of the membrane and a gas with affinity for oxygen to flow on the other side. The difference in oxygen partial pressure can be increased by supplying the oxidant under a higher total pressure than the gas with an affinity for oxygen.

For a given difference in the oxygen partial pressure, the stream of oxygen ions through the membrane increases at higher temperatures. This is also a reason for aiming for as high as possible a temperature. Only a limited number of metals can be used at high temperatures in both an oxidising and a reducing environment. Metals furthermore have the disadvantage that they have a different coefficient of expansion to the membrane conducting oxygen ions.

It is therefore desirable to use ceramic materials for the fuel cells and more particularly to use the same ceramic material for the porous electrical conductors as for the membrane conducting ions and to make this electrically conducting by means of additives. The additives can be homogeneously mixed through the material, but can also form an independent discrete structure in the porous material (by, for example, surrounding small ceramic spheres with a metal). As a result the coefficient of expansion of the conductors will be virtually the same as that of the membrane and thermal stresses will be homogeneously distributed.

A disadvantage of ceramic materials is their brittleness and the low permissible tensile stress.

In WO 01/71842A2 the cell stack can be introduced in one direction in a pressurised vessel. Furthermore, there is an externally acting yoke construction. The problem of brittleness described above can not be completely solved by this means.

SUMMARY OF THE INVENTION

This aim of the present invention is to promote use of ceramic materials in fuel cells and to eliminate the associated disadvantages such as the brittleness and the low permissible tensile strength.

Said aim is achieved with a fuel cell stack as described above in that said fuel cell stack is accommodated tightly fitting in said pressure vessel, said fuel cell stack bearing on said pressure vessel on all sides. As a result of the fuel stack cell being accommodated with a tight fit in a pressure vessel, at the higher temperature at which such ceramic fuel cells generally operate, the ceramic material thereof will be placed under pressure by contact with the vessel wall as a result of the expansion of the fuel cell stack. As a result the mechanical loading can be appreciably increased without the risk of cracking and possible leakages with all the damaging consequences of this.

According to the present invention the fuel cell stack is essentially in complete contact with the vessel wall around the entire periphery thereof. Such contact can be direct or via an auxiliary substance that transmits the pressure. If an auxiliary substance is used, there will still be complete contact between the fuel cell and auxiliary substance as well as between auxiliary and vessel wall. Such complete contact of the fuel cells with one another and with the vessel wall is essential in order to avoid internal stresses leading to cracking. According to the present invention, the pressure in the fuel cell is absorbed by the vessel in three different directions (x, y, z).

Preferably, the vessel is an elongated vessel and the cells are likewise of elongated construction. The cells are preferably located alongside one another in a central compartment of the vessel. This central compartment is bordered by end compartments arranged on either side which can be used for the supply and removal of reactants and are constructed to transmit pressure from the cell stack to the wall of the vessel.

Preferably, the reactants flow in counter-current in order to keep the temperature inside the electrochemical cells, and thus inside the vessel, as homogeneous as possible. With this arrangement the outgoing hot reactants can heat the incoming, in general colder, reactants.

Nevertheless it is impossible to avoid the outgoing reactants containing appreciable thermal energy. This can be converted into mechanical energy with the aid of a turbine. This mechanical energy can, for example, be used to generate electricity, but can also be used to compact the incoming reactants.

Methane is a widely used fuel in electricity generation. This gas has a low affinity for oxygen at the temperatures under consideration here. Moreover, some of this gas will decompose into solid carbon and hydrogen. The solid carbon will be able to block the pores of the equipment. By adding carbon dioxide, methane will be partially oxidised at the high prevailing temperatures to carbon monoxide and hydrogen. Both gases have a high affinity for oxygen. Depending on the choice of the ceramic material, it can be necessary to increase the concentration of carbon dioxide to such an extent that no hydrogen is formed from the partial oxidation of methane.

Biogas formed from the fermentation of organic material is a gas that contains approximately 50% carbon dioxide. It is therefore also suitable as feed for the present invention.

There is increasing concern about the greenhouse effect that is caused, inter alia, by the carbon dioxide that is released during the combustion of fossil fuels. Carbon dioxide has a high concentration at the discharge of this invention. It is therefore also relatively simple further to separate this carbon dioxide from the carbon monoxide and water vapour present and to convert it into liquid form by cooling and compression. The liquid can then be stored in empty natural gas or oil fields.

BRIEF DESCRIPTION OF THE DRAWINGS

The invention will be explained in more detail below with reference to an illustrative embodiment shown in the drawings. In the drawings.

DESCRIPTION OF THE PREFERRED EMBODIMENTS

Figure 1:
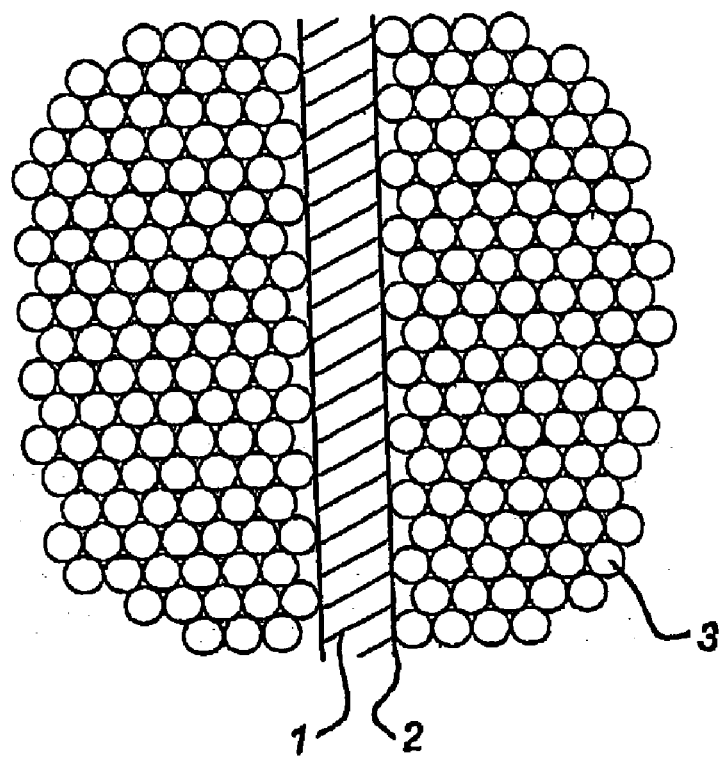
FIG. 1 shows, highly diagrammatically, a fuel cell of a cell stack according to the invention.
Figure 2:
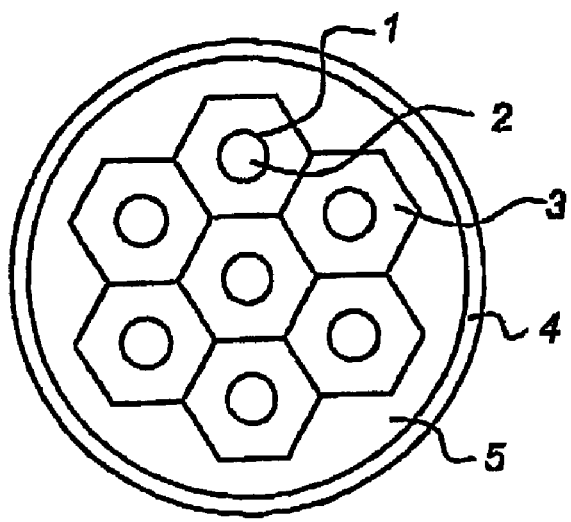
FIG. 2 shows a number of fuel cells according to the invention.
Figure 3:
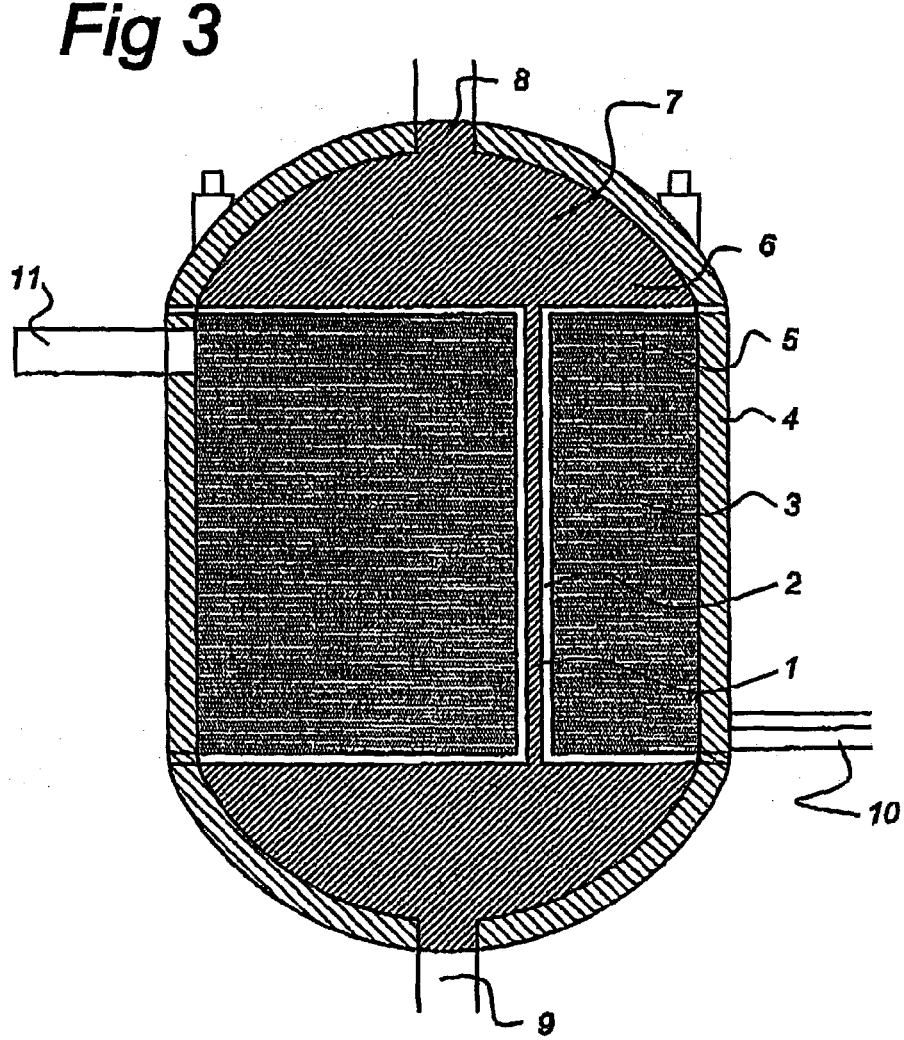
FIG. 3 shows, diagrammatically in cross-section, the fuel cell stack according to the invention fitted in a pressure vessel.

The fuel cell shown in FIG. 1 consists of a semi-conducting porous rod 1 of zirconium oxide, surrounded by a thin membrane of zirconium oxide 2, which conducts oxygen ions only. The whole is held tightly in a matrix of semi-conducting porous zirconium 3. This matrix is held under compression by a metal vessel 4, FIG. 2, that is thermally and electrically insulated from the matrix by a layer of zirconium oxide 5 that is not conducting and has no open porosity. Axially the matrix is insulated by a membrane 6, FIG. 3, of zirconium oxide that is conducting for oxygen ions only and a layer of porous, conducting zirconium oxide 7. The uppermost part of the rods 1 is not surrounded by an insulating membrane but is able to make electrical contact with the layer 7 of porous, conducting zirconium oxide. Connections for the supply of gas with an affinity for oxygen 8 and for the removal 9 of this gas that has been partially oxidised in the fuel cells 1 are made to the metal vessel 4. A feed 10 and discharge 11 for the gaseous oxidant are also connected to the vessel 4. The feed for the gas having a high affinity for oxygen and the feed for the gaseous oxidant are also provided with metal electrical conductors which form a connection from the equipment to an external power circuit.

Figure 4:
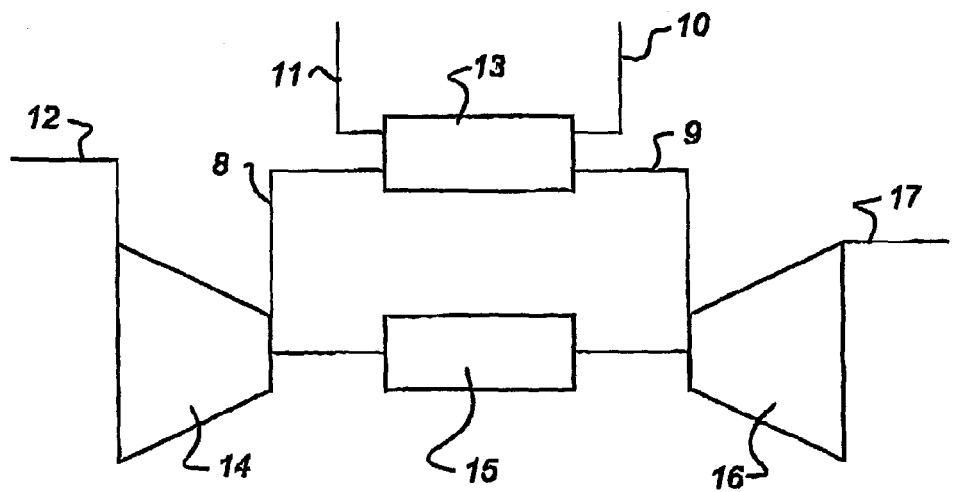
FIG. 4 is a circuit for the removal of reactant and the supply of reactants.

A typical circuit for converting the thermal energy released, in the case of thermodynamic losses, into electricity is given in FIG. 4. In this FIG. 12 is the feed for the oxidant, 13 the equipment to which this invention relates, 14 a compressor for the oxidant, 15 an electricity generator and 16 an expander. The electrical yield can be further increased by connecting a steam boiler downstream of the expander. The steam formed can be converted into electricity in a steam turbine with coupled generator. Part of the invention is to return the steam formed to the fuel cell and to heat it in the fuel cell. The steam will then, together with the remainder of the oxidant, drive the expander 16, as a result of which the quantity of electricity generated by the generator becomes greater.

What is claimed is:

1. A fuel cell stack comprising:
   a number of electrochemical cells,
   each cell comprising a high temperature ceramic cell having an anode, a cathode and a membrane arranged adjoining one another and in contact with one another in a fuel cell pressure vessel,
   wherein said fuel cell stack is accommodated tightly fitting in said pressure vessel, all sides of said fuel cell stack bearing on said pressure vessel so that pressure from the fuel cell stack is transmitted to the wall of the vessel.

2. The fuel cell stack as claimed in claim 1, wherein said electrochemical cells are elongated cells, having a first axis, said vessel is a cylindrical vessel, having a second axis, and wherein said cells are arranged in said vessel with the first axis essentially parallel to said second axis.

3. The fuel cell stack as claimed in claim 2, wherein electrolyte is arranged close to the ends of said cells.

4. The fuel cell stack as claimed in claim 2, wherein feeds/discharges for gas are arranged close to the ends of said cells.

5. The fuel cell stack as claimed in claim 2, wherein the supply/removal of a reactant of the electrochemical cell takes place in the direction of said first axis of the innermost of said tubular cathode or anode of each electrochemical cell and the supply/removal of the other reactant of said electrochemical cell takes place essentially from the outside of the outermost of said cathode or anode of each electrochemical cell.

6. The fuel cell stack as claimed in claim 1, wherein the outer boundary of said cells is hexagonal.

7. The fuel cell stack as claimed in claim 1, wherein the membrane comprises an electrolyte.

8. The fuel cell stack as claimed in claim 1, wherein said fuel cells are SOFC cells.

9. The fuel cell stack as claimed in claim 1, wherein three compartments, a central compartment for accommodating said electrical cells with compartments for supplying/removing reactants adjoining it on either side thereof, are delimited in said pressure vessel.

10. The fuel cell stack as claimed in claim 9, wherein at least one of said compartments is filled with porous zirconium oxide.

11. The fuel cell stack as claimed in claim 1, wherein a turbine is accommodated in the discharge for reactant, which turbine is mechanically connected to a compressor that is accommodated in the inlet for reactants.

12. The fuel cell stack as claimed in claim 11, wherein said turbine is coupled to an electricity generator.

13. The fuel cell stack as claimed in claim 1, wherein, the fuel cell stack is essentially in complete contact with the vessel wall around the entire periphery thereof, the contact being one of direct and via an auxiliary substance that transmits pressure.

14. The fuel cell stack as claimed in claim 13, wherein the contact is direct by all sides of the fuel cell stack directly contacting the pressure vessel.

15. A method for operating a fuel cell stack comprising a number of adjoining electrochemical cells with cell sides bearing on a pressure vessel, each cell comprising a high temperature ceramic cell having an anode, a cathode and a membrane arranged adjoining one another,
   comprising the steps of:
   supplying an oxidant and a fuel to the fuel cell stack to cause an electrochemical reaction;
   removing products liberated during the electrochemical reaction; and
   maintaining all sides of the fuel cell stack bearing on the pressure vessel during operation so that components of the fuel cell are subjected to a mechanical pressure all round and pressure generated in the fuel cell is absorbed by the vessel in three different directions (x, y, z).

16. The method as claimed in claim 15, comprising a further step, preceding said supplying step, wherein an assembly of said adjoining cells is introduced with a tight fit into a pressure vessel at a first low temperature which is at least 200° C. below a second higher temperature that constitutes the operating temperature of said fuel cells.

17. A fuel cell stack comprising:
a stack of adjacent fuel cells,
each cell comprising a high temperature ceramic cell having an anode, a cathode and a membrane arranged adjoining one another and in contact with one another in a pressure vessel,
wherein said fuel cell stack is accommodated tightly fitting in said pressure vessel so that pressure generated from the fuel cell stack is transmitted to the wall of the vessel.

18. The fuel cell stack of claim 17, wherein,
the fuel cells each comprise a semi-conducting porous rod of zirconium oxide, surrounded by a thin membrane of zirconium oxide, which membrane conducts oxygen ions only,
the rod and membrane are tightly held in a matrix of semi-conducting porous zirconium, and
the matrix is held under compression by the pressure vessel, 19. The fuel cell stack of claim 18, wherein,
a layer of zirconium oxide thermally and electrically insulates the pressure vessel from the matrix,
the layer of zirconium oxide is not conducting and has no open porosity, and
axially the matrix is insulated by a membrane of zirconium oxide that is conducting for oxygen ions only and a layer of porous, conducting zirconium oxide.

* * * * *